United States Patent [19]

Tipke

[11] Patent Number: 4,729,574
[45] Date of Patent: Mar. 8, 1988

[54] WHEELED MATERIAL CARRIER
[75] Inventor: James M. Tipke, Spokane, Wash.
[73] Assignee: Tipke Manufacturing Co., Inc., Spokane, Wash.
[21] Appl. No.: 6,947
[22] Filed: Jan. 27, 1987
[51] Int. Cl.⁴ .............................................. B60D 1/14
[52] U.S. Cl. ............................. 280/415 R; 280/47.18; 280/47.76; 280/47.33
[58] Field of Search .......... 280/204, 35, 656, 47.13 R, 280/47.17, 47.18, 47.26, 47.31, 30, 47.33, 47.37 R, 289 A, 415 R, 475, 491 R, 491 B, 63, 47.34

[56] References Cited
U.S. PATENT DOCUMENTS

| | | | |
|---|---|---|---|
| 3,442,268 | 5/1969 | Symes | 280/475 |
| 3,792,875 | 2/1974 | Paden | 280/204 |
| 3,909,042 | 9/1975 | Miller | 280/204 |
| 3,977,477 | 8/1976 | Wise | 280/47.18 |
| 3,998,476 | 12/1976 | Kazmark, Sr. | 280/47.37 R |
| 4,274,649 | 6/1981 | Vanderhorst et al. | 280/47.26 |

FOREIGN PATENT DOCUMENTS 221784  9/1942  Switzerland ................ 280/204

Primary Examiner—John J. Love
Assistant Examiner—Richard Camby
Attorney, Agent, or Firm—Wells, St. John & Roberts

[57] ABSTRACT

A wheeled material carrier convertible for use as a hand cart or as a vehicular trailer. The carrier is provided with side members having downwardly open sockets at their front edges. Interchangeable support member can be readily mounted to the wheeled material carrier. They can be selected from rigid legs releasably mounted in the sockets, a bicycle hitch having forwardly extending hitch members releasably mounted in the sockets, or a utility hitch having two forwardly extending hitch members releasably mounted in the sockets and a central hitch member releasably attached to a handle extending across the front of the carrier.

7 Claims, 3 Drawing Figures

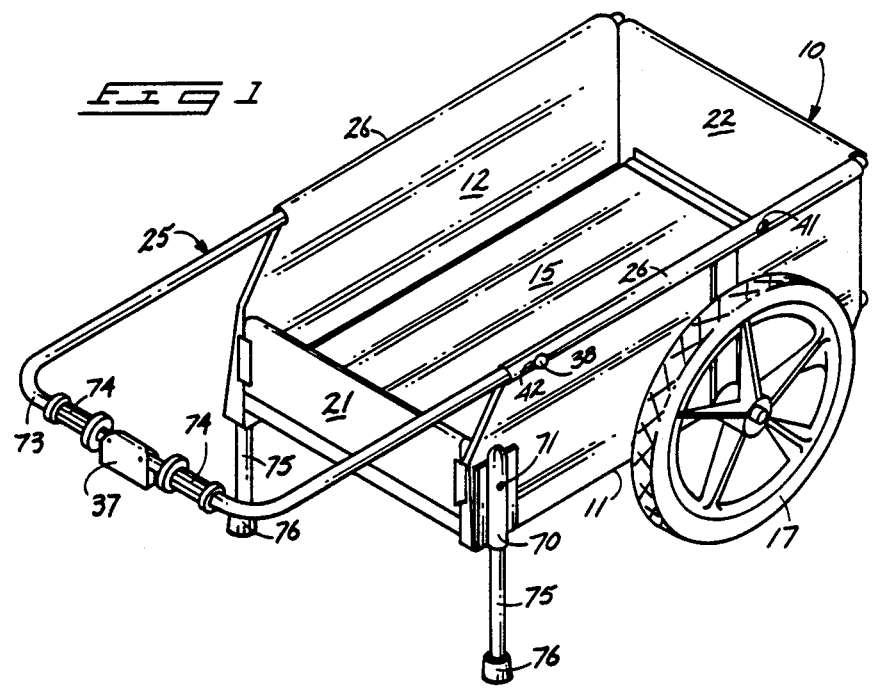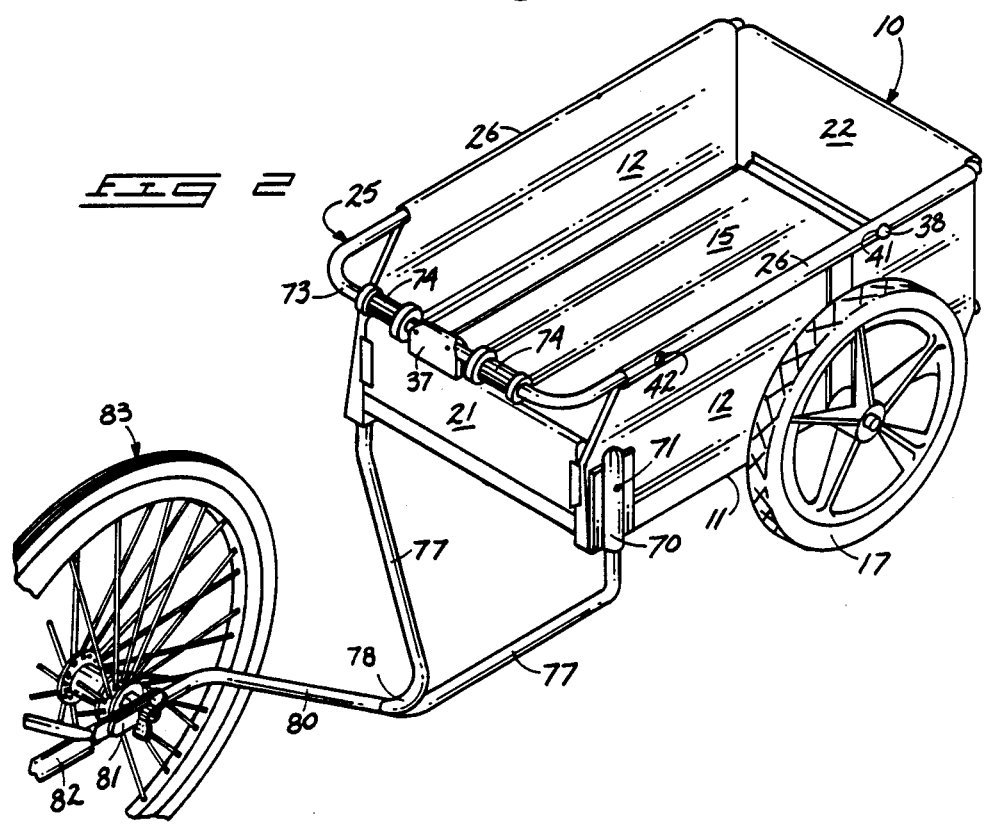

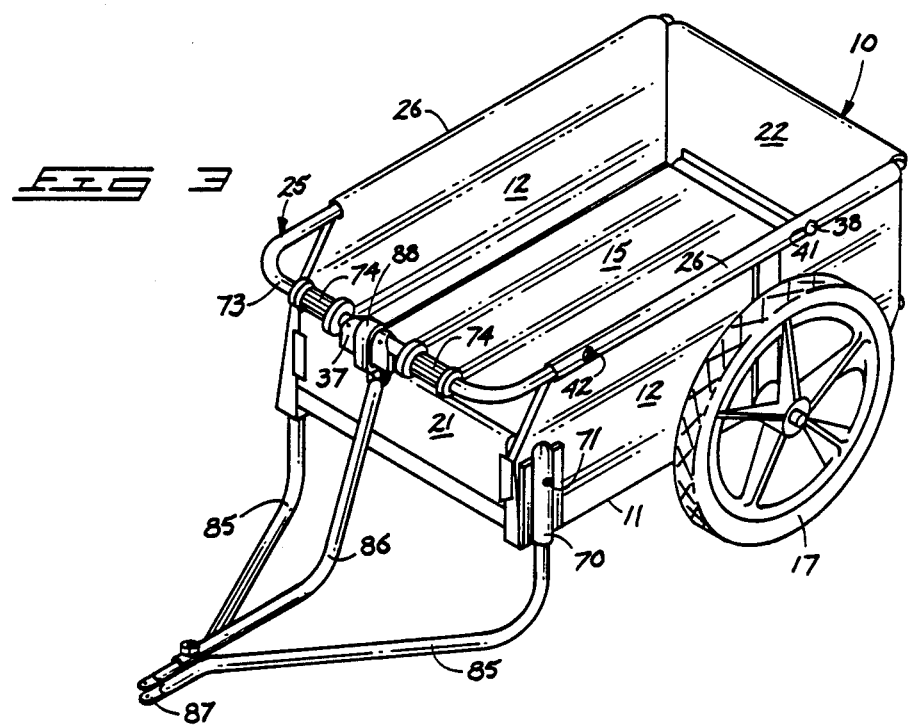

WHEELED MATERIAL CARRIER

TECHNICAL FIELD

This invention relates to a wheeled material carrier convertible for use as either a hand cart or a vehicular trailer.

BACKGROUND OF THE INVENTION

The development of this invention arose from continuing efforts to improve a collapsible wheeled carrier as shown and described in co-pending U.S. patent application Ser. No. 764,414, filed Aug. 12, 1985, which is hereby incorporated into this disclosure by reference. While the referenced product is collapsible for storage purposes, the features of the present invention are not limited to collapsible carts and can be equally useful when applied to any wheeled material carrier desired to be convertible for use as either a hand cart or a vehicular trailer.

To provide ready convertibility in a wheeled carrier, it is necessary to provide a transverse handle for manual grasping of the carrier by one pulling or pushing it as a hand cart, as well as rigid supports for holding it in a level condition when not being used. It is also important to provide a readily detachable hitch or hitches for attachment to a selected vehicle, such as a bicycle, motorcycle, automobile, or small garden tractor. The present improvements arose from an effort to provide these convertible features at minimal cost by using one pair of receiving sockets on the wheeled material carrier for the external attachments required by its alternate uses. It also makes possible the reconfiguration of the wheeled material carrier without any tools or mechanical experience being required.

BRIEF DESCRIPTION OF THE DRAWINGS

The preferred embodiment of the invention is illustrated in the accompanying drawings, in which:

FIG. 1 is a perspective view showing the wheeled material carrier configured for use as a hand cart;

FIG. 2 is a similar view showing it configured as a bicycle trailer; and

FIG. 3 is a similar view showing it configured as a utility trailer.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Referring now to the drawings, the wheeled material carrier 10 essentially comprises a frame 11 formed symmetrically along a longitudinal centerline and having longitudinally spaced front and rear ends. Frame 11 can be either rigid or collapsible. A bottom wall 15 extends between the front and rear ends of the frame for support of materials within the wheeled carrier 10. The bottom wall is shown as being rectangular, but can have any desired shape. The wheeled carrier 10 is provided with upright front and rear end walls 21 and 22, which span upright side members 12 along the respective opposite sides of bottom wall 15. The configuration of the walls 21 and 22, as well as side members 12 will be dependent upon specific uses for which the wheeled material carrier might be designed. In some situations, one or the other, or both of the individual walls 21, 22 might be totally omitted.

A pair of wheels 17 are rotatably mounted at opposite sides of the frame 11 about a common transverse axis. They serve as primary ground support for the load contained within the material carrier 10.

A horizontal U-shaped handle 25 is provided at the front end of the material carrier 10. It is mounted to the respective side members 12 for movement between an extended position (FIGS. 2 and 3) and a retracted position (FIG. 1). It is provided with manually controllable detents 38, which are selectively received within holes 41 or slots 42 provided along cylindrical tubes 26 at the top edges of the side members 12 depending upon whether handle 25 is in its retracted or extended position. Handle 25 can include a center bracket 37, which facilitates transverse folding of the handle when the cart is of a foldable or collapsible nature.

To facilitate the carrier being convertible for use as a manual hand cart or as a vehicular trailer, a pair of downwardly open sockets 70 are fixed to the front end of the frame 11 in transversely spaced upright positions at opposite sides of a longitudinal center line spaced midway between the two side members 12. As shown, the sockets 70 are formed or joined to the outside surfaces of the side members 12 adjacent their front edges. They are preferably arranged in a vertical orientation perpendicular to the plane of bottom wall 15. As described below, the convertibility of the carrier is achieved by selectively mounting interchangeable support members in the sockets 70 and, when desirable, interconnecting the support members and the handle 25.

The interchangeable support members shown in the drawings, are selectable from the following choices:

(a) A pair of downwardly extending rigid legs (FIG. 1) releasably mounted in the respective sockets 70 to act as ground engaging supports for the front end of the frame 11 when the wheeled material carrier is being utilized as a hand cart; handle 25 then being arranged in an extended position, with a transverse section 73 of handle 25 being spaced forwardly from the front end of the frame 11;

(b) A pair of forwardly extending rigid hitch members (FIG. 2) including rear ends releasably mounted in the respective sockets 70 and front ends provided with means for attachment to a bicycle when the wheeled material carrier is being utilized as a trailer; the handle 25 then being in its retracted position, with the transverse section 73 of handle 25 being located adjacent to the front end of the frame 11; or (c) Three forwardly-extending rigid hitch members (FIG. 3), in which two of the hitch members include rear ends releasably mounted in the respective sockets 70 and the remaining one hitch member includes a rear end attached to the transverse section of handle 25 while in its retracted position; and in which the three hitch members have forward ends rigidly joined to one another to structurally interconnect the frame 11 and handle 25 as a utility trailer hitch for attachment to a towing vehicle.

FIG. 1 shows the configuration of the wheeled material carrier 10 when being utilized as a hand cart that can be manually pushed or pulled for carrying loads, such as trash cans, garden materials, firewood, etc. Handle 25 is in its extended position with transverse section 73 located forwardly from the front end of frame 11. The extension of handle 25 provides added manual leverage for pivoting the frame 11 about the axis of wheels 17 so that a load carried on bottom wall 15 can be balanced within the carrier 10 and easily pushed or pulled over a supporting ground surface. To further facilitate manual pushing or pulling of carrier 10, the transverse section 73 of handle 25 is provided with a pair of transversely spaced grips 74. They are located at opposite sides of the centrally positioned bracket 37.

In the hand cart configuration, the support members mounted within sockets 70 comprise rigid straight legs 75, which are preferably tubular in structure and complementary to the interior of the respective sockets 70. Each includes a manually releasable detent 71 which protrudes outwardly through an open aperture 72 in the receiving socket 70 when the leg is locked in place. Detents 71 prevent legs 75 from dropping downwardly when the front end of the cart is lifted by gripping of the handle 25. The bottom ends of legs 75 can be provided with caps 76 to assist in frictionally gripping the supporting surface engaged by the legs 75 when carrier 10 is stationary.

If the wheeled material carrier 10 is to be used as a vehicular trailer drawn by a bicycle, the interchangeable support member shown in FIG. 2 would be substituted in place of the legs 75. In the trailer configurations, handle 25 is utilized in its retracted position. The bicycle hitch includes a pair of forwardly extending members 77 which are connected to one another at a location 78 located forwardly and to one side of the frame 11. They further include an extension 80 leading forwardly from their connection at 78 to a location 81 generally aligned with the center line of frame 11. Any type of suitable hitch connection to a frame element 82 of a towing bicycle 83 can be provided at the location 81. In FIG. 2 this is shown as a connecting horizontal pin.

When used as a utility trailer that can be pulled by a small automobile, a motorcycle, a small tractor, or any other suitable vehicle (not shown), the wheeled material carrier 10 is generally configured as shown in FIG. 3. As an alternate to the legs 75 or bicycle hitch members 77, three forwardly-extending hitch members are provided to interconnect the handle 25 and frame 11. A more substantial hitch structure is provided by this interconnection than is provided in the bicycle hitch configuration, since the carrier is designed to be capable of hauling heavier loads as a utility trailer than as a bicycle trailer, where the practical limits of the loads being trailed are defined by the lower capability of the vehicle and user.

The utility hitch includes two hitch members 85 with rear ends releasably mounted in the respective sockets 70, and again provided with releasable detents 71 that can interlock within aperture 72. The two members 85 have sections extending forwardly toward the center line of the frame 11. The remaining one hitch member 86 is aligned along the center line of frame 11. The forward ends of the three hitch members 85 and 86 are joined to one another at a location 87 aligned along the center line of frame 11. The utility hitch can be provided with any form of desired vehicular hitch bracket or arrangement at the location 87. This is shown in FIG. 3 as a vertical aperture through which a connecting pin (not shown) on the towing vehicle can be received. It is to be understood that the members 85 and 86 can alternately be provided with suitable brackets for a ball hitch or any other form of towing attachment device complementary to the needs of the towing vehicle.

While the center member 86 in the utility trailer hitch arrangement can be fastened to the handle 25 in any manner, it is preferably releasably hooked about the transverse section 73 of handle 25 by a bent bracket 88 that fits over and engages the front and back sides of the bracket 37. Bracket 88 permits the member 86 to be joined to handle 25 after members 85 are located within socket 70, since it can be hooked over bracket 37 by slight downward movement of the center of the handle transverse section 73 relative to the rear end of the center hitch member 86. No tools or other mechanical attachment are necessary in order to effect this interconnection, which presents several triangular connections between the utility hitch connection and the frame 11 in three dimensions, and thereby adds substantial rigidity to the hitch. This rigidity enables the utility hitch to support substantially greater loads than is possible when supporting carrier 10 in the sockets 70 alone.

The interchangeable support members shown in FIGS. 1, 2 and 3 greatly facilitate the versatility of carrier 10, permitting it to be used for a variety of tasks and to be adapted to be pulled by different complementary towing vehicles. The support members required for a particular task can be manually interchanged by the user without the use of any tools and without any specific mechanical skills being required.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A wheeled material carrier convertible for use as a hand cart or as a vehicular trailer, comprising:
    a frame formed symmetrically along a longitudinal center line and having longitudinally spaced front and rear ends;
    a pair of wheels rotatably mounted at opposite sides of the frame about a common transverse axis;
    a bottom wall extending between the front and rear ends of the frame;
    a pair of side members extending between front and rear edges along opposite sides of the bottom wall;
    a pair of downwardly open sockets fixed to the front end of the frame in transversely spaced upright positions at opposite sides of its longitudinal center line;
    a handle having a transverse section joined by spaced legs which are mounted to the respective side members for movement of the handle between an extended position with the transverse section of the handle spaced forwardly from the front end of the frame during use of the wheeled material carrier as a hand cart, and a retracted position with the transverse section of the handle located adjacent to the front end of the frame during use of the wheeled material carrier as a vehicular trailer; and
    interchangeable support means releasably mounted in the respective sockets for facilitating usage of the material carrier either as a hand cart or as a vehicular trailer;
    the support means comprising a pair of forwardly-extending rigid hitch members including rear ends releasably mounted in the respective sockets and front ends provided with means for attachment to a bicycle when the wheeled material carrier is being utilized a a trailer.

2. The wheeled material carrier of claim 1 wherein the pair of forwardly extending rigid hitch members are connected to one another at a location forwardly and to one side of the frame and further include an extension leading forwardly from their connection to a location generally aligned along the centerline of the frame.

3. A wheeled material carrier convertible for use as a hand cart or as a vehicular trailer, comprising:
   a frame formed symmetrically along a longitudinal center line and having longitudinally spaced front and rear ends;
   a pair of wheels rotatably mounted at opposite sides of the frame about a common transverse axis;
   a bottom wall extending between the front and rear ends of the frame;
   a pair of side members extending between front and rear edges along opposite sides of the bottom wall;
   a pair of downwardly open sockets fixed to the front end of the frame in transversely spaced upright positions at opposite sides of its longitudinal center line;
   a handle having a transverse section joined by spaced legs which are mounted to the respective side members for movement of the handle between an extended position with the transverse section of the handle spaced forwardly from the front end of the frame during use of the wheeled material carrier as a hand cart, and a retracted position with the transverse section of the handle located adjacent to the front end of the frame during use of the wheeled material carrier as a vehicular trailer; and
   interchangeable support means releasably mounted in the respective sockets for facilitating usage of the material carrier either as a hand cart or as a vehicular trailer;
   the support means comprising three forwardly-extending rigid hitch members in which two of the hitch members include rear ends releasably mounted in the respective sockets and the remaining one hitch member includes a rear end attached to the transverse section of the handle while in its retracted position, the three hitch members having forward ends rigidly joined to one another to structurally interconnect the cart frame and handle as a utility tractor hitch for attachment to a towing vehicle.

4. The wheeled material carrier of claim 3 wherein the two hitch members each have sections extending forwardly toward the center line of the frame and the remaining one hitch member is aligned along the center line of the frame, the forward ends of the three hitch members being joined to one another at a location aligned along the centerline of the frame.

5. The wheeled material carrier of claim 3 wherein the rear end of the remaining one hitch member is releasably hooked about the transverse section of the handle.

6. A wheeled material carrier convertible for use as a hand cart or as a vehicular trailer, comprising:
   a frame formed symmetrically along a longitudinal center line and having longitudinally spaced front and rear ends;
   a pair of wheels rotatably mounted at opposite sides of the frame about a common transverse axis;
   a bottom wall extending between the front and rear ends of the frame;
   a pair of side members extending between front and rear edges along opposite sides of the bottom wall;
   a pair of downwardly open sockets fixed to the front end of the frame in transversely spaced upright positions at opposite sides of its longitudinal center line;
   a handle having a transverse section joined by spaced legs which are mounted to the respective side members for movement of the handle between an extended position with the transverse section of the handle spaced forwardly from the front end of the frame during use of the wheeled material carrier as a hand cart, and a retracted position with the transverse section of the handle located adjacent to the front end of the frame during use of the wheeled material carrier as a vehicular trailer; and
   interchangeable support members selected from one of the following choices:
   (a) a pair of downwardly-extending rigid legs releasably mounted in the respective sockets to act as ground engaging supports for the front end of the frame when the wheeled material carrier is being utilized as a hand cart;
   (b) a pair of forwardly-extending rigid hitch members including rear ends releasably mounted in the respective sockets and front ends provided with means for attachment to a towing vehicle; or
   (c) three forwardly-extending rigid hitch members, in which two of the hitch members include rear ends releasably mounted in the respective sockets and the remaining one hitch member includes a rear end attached to the transverse section of the handle while in its retracted position, and in which the three hitch members each have forward ends rigidly joined to one another to structurally interconnect the cart frame and handle as a utility trailer hitch for attachment to a towing vehicle.

7. The wheeled material carrier of claim 6 wherein said sockets are individually fixed to the respective side members adjacent their front edges.

* * * * *